US008954964B2

(12) United States Patent
Weinstein et al.

(10) Patent No.: US 8,954,964 B2
(45) Date of Patent: Feb. 10, 2015

(54) SYSTEM AND METHOD FOR ISOLATED VIRTUAL IMAGE AND APPLIANCE COMMUNICATION WITHIN A CLOUD ENVIRONMENT

(75) Inventors: Igal Weinstein, Modiin (IL); Nir Barak, Karmi Yosef (IL)

(73) Assignee: CA, Inc., New York, NY (US)

( * ) Notice: Subject to any disclaimer, the term of this patent is extended or adjusted under 35 U.S.C. 154(b) by 127 days.

(21) Appl. No.: 13/406,088

(22) Filed: Feb. 27, 2012

(65) Prior Publication Data
US 2013/0227550 A1 Aug. 29, 2013

(51) Int. Cl.
G06F 9/455 (2006.01)

(52) U.S. Cl.
USPC ................................. 718/1; 726/15

(58) Field of Classification Search
USPC ................................. 726/15; 718/1
See application file for complete search history.

(56) References Cited

U.S. PATENT DOCUMENTS

| | | | |
|---|---|---|---|
| 4,969,092 A | 11/1990 | Shorter | |
| 4,991,089 A | 2/1991 | Shorter | |
| 5,095,427 A | 3/1992 | Tanaka | |
| 6,496,847 B1 | 12/2002 | Bugnion | |
| 7,802,251 B2 | 9/2010 | Kitamura | |
| 7,961,722 B1 * | 6/2011 | Jankowski | 370/381 |
| 7,962,950 B2 | 6/2011 | Choo | |
| 8,201,237 B1 * | 6/2012 | Doane et al. | 726/15 |
| 8,443,440 B2 * | 5/2013 | McGee | 726/22 |
| 8,484,732 B1 | 7/2013 | Chen | |
| 8,528,070 B2 * | 9/2013 | Stiekes et al. | 726/11 |
| 8,538,919 B1 | 9/2013 | Nielsen | |
| 8,875,240 B2 | 10/2014 | Spiers et al. | |
| 2005/0097534 A1 | 5/2005 | Clement | |
| 2005/0183143 A1 | 8/2005 | Anderholm | |
| 2006/0143359 A1 | 6/2006 | Dostert | |
| 2007/0106992 A1 | 5/2007 | Kitamura | |
| 2007/0204153 A1 | 8/2007 | Tome | |
| 2008/0086726 A1 | 4/2008 | Griffith | |
| 2008/0163211 A1 | 7/2008 | Mizuno | |
| 2008/0184225 A1 | 7/2008 | Fitzgerald et al. | |
| 2008/0256533 A1 | 10/2008 | Ben-Yehuda | |
| 2008/0271015 A1 | 10/2008 | Ibrahim | |
| 2009/0013149 A1 | 1/2009 | Uhlig | |
| 2009/0198809 A1 | 8/2009 | Goto | |
| 2009/0293056 A1 | 11/2009 | Ferris | |

(Continued)

OTHER PUBLICATIONS

Non-Final Office Action issued for U.S. Appl. No. 13/405,973, dated Apr. 1, 2013.

(Continued)

*Primary Examiner* — Emerson Puente
*Assistant Examiner* — Charlie Sun
(74) *Attorney, Agent, or Firm* — Pillsbury Winthrop Shaw Pittman LLP

(57) ABSTRACT

Provided herein are systems and methods for providing isolated virtual image communication in a virtual computing environment. Initially, a guest virtual machine that is activated in a virtual computing environment may be isolated into a private network. A service request may then be formulated at the guest virtual machine and addressed to a predetermined non-existent address. The request is then ostensibly sent to the predetermined address, whereupon the service request is actually transmitted to a shared resource with a security appliance machine in the virtual computing environment. The request is then forwarded to the security appliance machine and a reply formulated. The reply is sent back to the guest virtual machine via the shared resource.

33 Claims, 3 Drawing Sheets

(56) References Cited

U.S. PATENT DOCUMENTS

| | | |
|---|---|---|
| 2009/0300607 A1 | 12/2009 | Ferris et al. .................. 718/1 |
| 2009/0307705 A1* | 12/2009 | Bogner ...................... 718/104 |
| 2010/0031339 A1* | 2/2010 | Minnen ....................... 726/12 |
| 2010/0042720 A1 | 2/2010 | Stienhans et al. ............ 709/226 |
| 2010/0125664 A1 | 5/2010 | Hadar et al. ................ 709/224 |
| 2010/0125902 A1* | 5/2010 | Killian et al. ................ 726/15 |
| 2010/0132016 A1 | 5/2010 | Ferris |
| 2010/0198972 A1 | 8/2010 | Umbehocker ............... 709/226 |
| 2010/0199037 A1 | 8/2010 | Umbehocker et al. ........ 711/113 |
| 2010/0205304 A1 | 8/2010 | Chaturvedi |
| 2010/0287280 A1 | 11/2010 | Sivan ......................... 709/226 |
| 2010/0299366 A1 | 11/2010 | Stienhans et al. ............ 707/803 |
| 2010/0306463 A1 | 12/2010 | Nakamura |
| 2010/0325628 A1 | 12/2010 | Haga |
| 2011/0022574 A1 | 1/2011 | Hansen ...................... 707/698 |
| 2011/0047543 A1 | 2/2011 | Mohinder |
| 2011/0055378 A1 | 3/2011 | Ferris et al. ................. 709/224 |
| 2011/0055714 A1 | 3/2011 | Vemulapalli et al. ......... 715/739 |
| 2011/0072486 A1 | 3/2011 | Hadar et al. |
| 2011/0072487 A1 | 3/2011 | Hadar et al. .................. 726/1 |
| 2011/0138047 A1 | 6/2011 | Brown et al. ................ 709/226 |
| 2011/0142053 A1* | 6/2011 | Van Der Merwe et al. ................ 370/395.1 |
| 2011/0197065 A1 | 8/2011 | Stauth |
| 2011/0225582 A1 | 9/2011 | Iikura |
| 2012/0054486 A1 | 3/2012 | Lakkavalli |
| 2012/0144005 A1 | 6/2012 | Quintard |
| 2012/0159469 A1* | 6/2012 | Laor ........................... 717/173 |
| 2012/0179904 A1 | 7/2012 | Dunn |
| 2013/0061222 A1 | 3/2013 | Hwang et al. |
| 2013/0097296 A1* | 4/2013 | Gehrmann et al. .......... 709/223 |
| 2013/0263208 A1 | 10/2013 | Challa |
| 2014/0006776 A1 | 1/2014 | Scott-Nash |

OTHER PUBLICATIONS

Final Office Action issued for U.S. Appl. No. 13/405,973, dated Sep. 23, 2013.
Notice of Allowance as issued for U.S. Appl. No. 13/633,454, dated Nov. 29, 2013.
Office Action issued for U.S. Appl. No. 14/213,881 dated Jul. 16, 2014.
Office Action as issued in U.S. Appl. No. 13/633,487, dated Nov. 19, 2014.
Office Action as issued in U.S. Appl. No. 14/213,881, dated Nov. 19, 2014.
Notice of Allowance as issued in U.S. Appl. No. 14/213,881, dated Dec. 3, 2014.

* cited by examiner

SYSTEM AND METHOD FOR ISOLATED VIRTUAL IMAGE AND APPLIANCE COMMUNICATION WITHIN A CLOUD ENVIRONMENT

CROSS-REFERENCE TO RELATED APPLICATIONS

This application is related to the following co-pending applications, filed concurrently herewith, the disclosures of which are hereby incorporated by reference in their entirety: U.S. patent application Ser. No. 13/406,036, entitled "System and Method for Securing Leased Images in a Cloud Environment," and U.S. patent application Ser. No. 13/405,973, entitled "System and Method for Virtual Image Security in a Cloud Environment."

FIELD

The invention relates generally to the field of communication of virtual images in cloud computing environments, and more particularly to communication with isolated virtual images in cloud computing environments.

BACKGROUND

Cloud computing has augmented the requirements and capacity available for businesses, individuals, and other entities to implement their computing needs. Cloud computing providers offer systems and computational power as a service to customers so that the customer does not need to bear the cost of space, energy, and maintenance in order to acquire the required computational resources. While traditional security and protection measures may be used in cloud environments, in some instances, customers want to apply additional layers of protection to their cloud services. This can be done by "isolating" the resource or resources hosted by a cloud provider to a cloud consumer. However, typically, isolated resources cannot receive services outside their isolated environment.

As such, in some instances it may be desirable to provide robust and secure solutions enabling a cloud consumer's resources to share and consume data with service providers while keeping isolation rules in place and controlling the services that can be provided from outside. Furthermore, these solutions must suit cloud environments that are agile in nature, where images migrate between hosts and must receive services oblivious to the move.

SUMMARY

Provided herein are systems, methods, and computer-readable media for providing isolated virtual image communication in a virtual computing environment. The systems and methods provided herein include the providing communication services to an isolated guest virtual machine without removing the isolation rules and/or other security protocols of the isolated machine. The systems and methods utilize a service request that is formulated having a predetermined non-existent address. The request is then ostensibly sent to the predetermined non-existent address, whereupon the service request is actually transmitted to a resource that is shared with a security appliance machine in the virtual computing environment. The resource is a "shared resource" because it runs on a physical component of the virtual computing environment (e.g., a hypervisor) that supports both the guest virtual machine and the security appliance machine. The request is then forwarded from the shared resource to the security appliance machine and a reply formulated. The reply is sent back to the guest virtual machine via the shared resource.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Provided herein are systems and methods that maintain network isolation and existing boundaries for isolated virtual images in a virtual environment, while allowing sharing and consumption of data needed from a cloud provider (e.g., external images) or other resources, in a trusted and controlled environment. Accordingly the systems and methods provided herein enable isolated images to share and consume data with service providers, without network communication, while keeping network rules in place and controlling the services that can be provided from outside the isolated environment.

Figure 1:
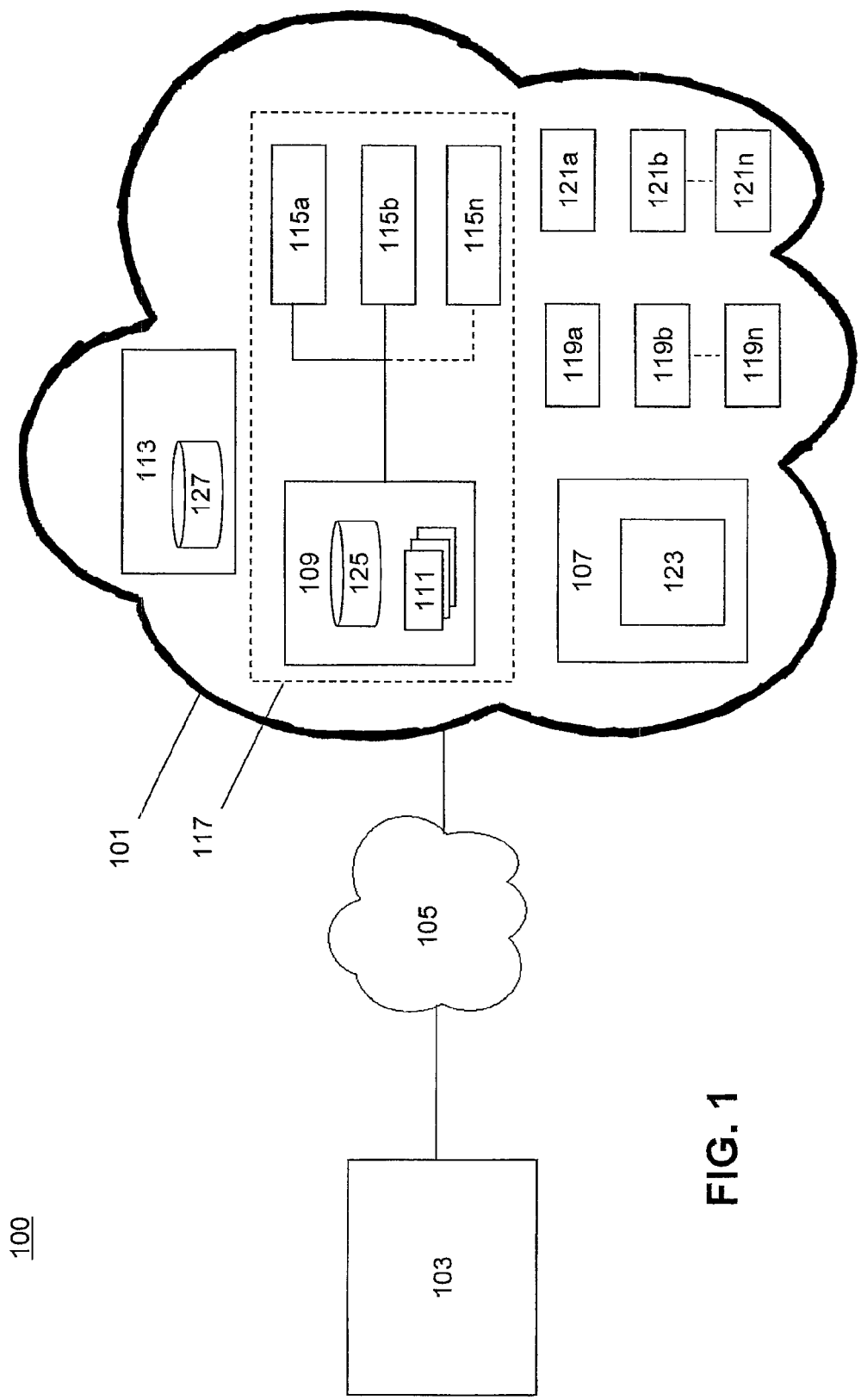
FIG. 1 is an illustration of an example system for providing isolated image communication in a cloud computing environment, according to various implementations of the invention.

FIG. 1 illustrates an environment 100, which is an example of an environment wherein a system resides for isolated image service communication in a virtual computing environment. Environment 100 may include a cloud environment 101, one or more user devices 103, a computer network 105, and/or other elements.

In some implementations, cloud environment 101 may be or include a virtualized computing environment wherein one or more services are provided to one or more users at one or more user devices 103. The virtualized computing environment of cloud environment 101 may be supported by a hypervisor 107. A hypervisor (or virtual machine manager) is a software system located on one or more physical computing machines that support a virtual/cloud computing environment. The hypervisor supports the virtual computing environment, and various virtual machines thereon, by providing logical definitions for virtualized hardware resources of the one or more virtual machines.

As used herein, the term "virtual machine" refers to a logically defined computing machine (as opposed to a physically defined computing machine) that may be identified by one or more logical characteristics but which in reality is composed of or supported by a static or dynamic set of one or more physical computing devices providing memory, processing power, or other computing features (as defined by a hypervisor). As used herein the term "image" or "virtual image" may refer to a virtual machine in a cloud or virtual machine environment. A virtual machine or image is essentially an emulation of computing hardware (physical computing devices), wherein software is used to provide a computing environment that looks to users as physical machine that the user can run applications on. Accordingly, the actions performed by virtual machines or images described herein may be performed using one or more processing devices (e.g., microprocessors) of one or more physical computing machines supporting the virtual computing environment. Similarly, any data storage needs or actions relating thereto may be provided or facilitated by the memory devices (e.g., RAM, hard disc, eeprom, flash memory, etc.) of one or more physical computing machines supporting the virtual computing environment. Furthermore, the term "cloud computing" or "cloud computing environment," may refer to a virtual computing environment supporting one or more virtual machines.

In some implementations, cloud environment 101 may include one or more guest virtual machines 109. A guest virtual machine (e.g., guest virtual machine 109) may refer to an image/virtual machine that provides a specific service or set of specific services for use by a cloud consumer (or "user"). In some implementations, one or more applications, media, data access, data manipulation, and/or other services 111 are consumed by consumers (operating one or more user devices 103) via virtual guest machines 109. Services 111 provided by an individual guest virtual machine 109 may be customized according to the needs of a given user such that a bundle or suite of applications or other services 111 may be provided to a user by a given guest virtual machine 109 and or such that a given customized instance of an application 111 may be provided to a user by a given guest virtual machine 109 or by several guest virtual machines. Furthermore, guest virtual machine 109 may provide applications, media, data, or other services 111 that a user has loaded onto guest virtual machine 109 themselves. Accordingly, guest virtual machine 109 may provide storage and/or processing services to a user.

In some implementations, cloud environment 101 may include a security appliance machine 113. Security appliance machine 113 may be or include a virtual machine in cloud environment that provides security functions to guest virtual machine 109, including security functions that enable provision of services to guest virtual machine 109 while isolation rules are in place for guest virtual machine 109. In some virtualization environments, guest virtual machines may be isolated machines in that they are established or placed into a private virtual network. A private virtual network is a logical construct that enables one or more virtual machines to exist in their virtualization environment such that they are unreachable to machines (virtual or otherwise) that are outside of the private virtual network. Accordingly, machines in such private virtual networks are said to be "isolated." Such isolation provides security to the services and data supported by isolated guest virtual machines.

FIG. 1 illustrates that guest virtual machine 109 and additional virtual machines 115a-115n are within a private virtual network 117 operating on cloud environment 101. Accordingly, guest virtual machine 109 (as well as additional virtual machines 115a-115n) are isolated from other machines in cloud environment 101 (e.g., security appliance machine 107, other virtual machines 119a-119n, physical machines 121a-121n). However, as they are within private virtual network 117, guest virtual machine 109 and additional virtual machines 115a-115n may communicate freely with one another.

Cloud environment 101 also includes a resource 123 that is shared between guest virtual machine 109 and security appliance 113 (e.g., a shared resource) so as to supply a communication mode when guest virtual machine 109 is isolated. In one example, the shared resource 123 may be a network filter that operates on hypervisor 107. Because this network filter 123 is a shared resource (i.e., it operates on hypervisor 107 which supports both guest virtual machine 109 and security appliance machine 113), it provides the necessary communication channel to an isolated machine. Another example of a shared resource that may be used as shared resource 123 is a memory of hypervisor 107 which cloud environment 101 has APIs to access. Other shared resources may be used.

In some instances, guest virtual machine 109 (or a consumer/user thereof) may require resources or services outside of its private virtual network 117. Network filter 123 provides the ability to communicate outside of private virtual network 117 while leaving network isolation rules in place. Accordingly, guest virtual machine 109 may include, store, or otherwise have access to a data store 125, which stores data regarding at least one predetermined, non-existent machine address ("non-existent address") that may be used as described herein to acquire services/resources/information from outside of private virtual network 117 while leaving network isolation rules in place. From the perspective of guest virtual machine 109, the non-existent address is used when resources outside of private virtual network 117 are needed by guest virtual machine 109. Guest virtual machine 109 requests the service from the non-existent address without being aware whether the address is local or not. Filter 123 (which has and interface on both private virtual network 117 and areas of cloud environment 101 outside of private virtual network 117) of course has no route for the non-existent address, but before filter 123 even tries to route the request to the non-existent address, network filter 123 sends the request to security appliance machine 113 for inspection. Accordingly, use of this non-existent address in a service request actually causes routing of the service request outside of private virtual network 117 to security appliance machine 113 which interacts with resources that service the request. Accordingly, in some implementations, security appliance machine 113 may include a data store 127 that includes information relating to the fact that service requests using the predefined non-existent address are coming from an isolated guest virtual machine 109 in need of external services/resources.

In some implementations, guest virtual machine 109 may be provided for the specific use of a user, or group of users. Through guest virtual machine 109, a user may utilize or interact with the one or more services 111 hosted thereon. As discussed above, in some implementations, guest virtual machine 109 may be provided with one or more applications or services 111 installed thereon. In some implementations, a user may install one or more applications/services 111 onto a guest virtual machine 109 provided by a provider of cloud environment 101.

In some implementations, a user may interact with guest virtual machine 109 via one or more of user devices 103 (e.g., through network 105). While guest virtual machine 109 is isolated from other virtual machines in cloud environment 101 (e.g., virtual machines that are used by other consumers), an authorized user device 103 (or an authorized user) can access the services 111 of the isolated guest virtual machine 109 via network 105. In some implementations, user devices 103 may be or include one or more servers, desktop computers, laptop computers, tablet computers, hand-held computers, smart phones, cellular phones, personal digital assistants (PDAs), and/or other computing devices.

Network 105 may be or include the Internet or the World Wide Web ("www"). In some implementations, network 105 may be or include a switching fabric that is part of a Wide Area Network (WAN), a Local Area Network (LAN), or other types of networks known to those of ordinary skill in the art (e.g., a TCP/IP network). In some implementations, network 105 may use or include wired, wireless, optical, or other types of communication links.

Figure 2:
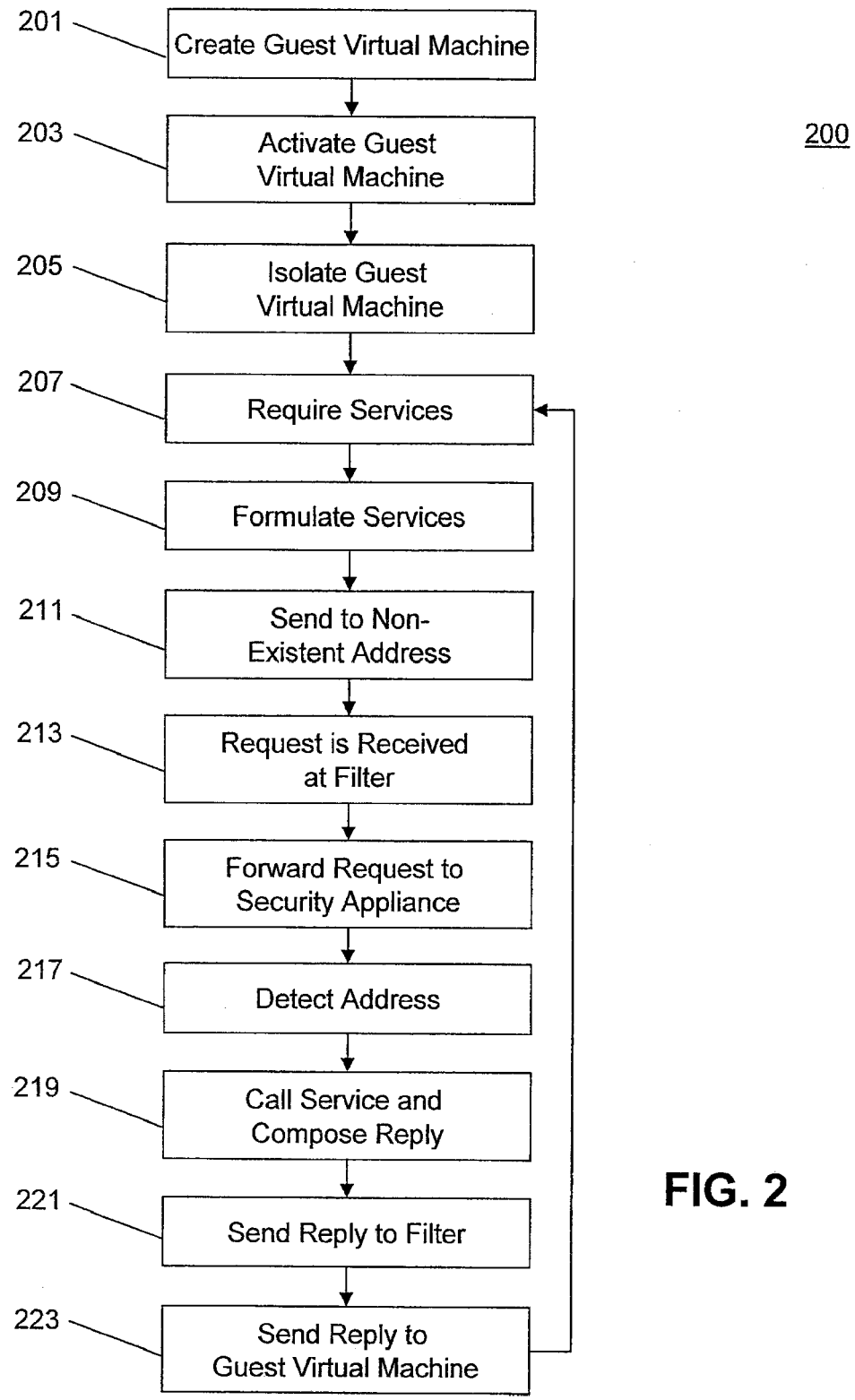
FIG. 2 is an illustration of an example method for providing isolated image communication in a cloud computing environment, according to various implementations of the invention.

In some implementations, the invention provides methods for providing isolated image service communication. FIG. 2 illustrates a process 200, which is an example of a process for providing isolated image service communication. Process 200 may include an operation 201, wherein a guest virtual machine (e.g., guest virtual machine 109) may be created. Creation of guest virtual machine 109 may involve instantiating a template in cloud environment 101 and adding any specific software, interfaces, and/or other customizations thereto. In an operation 203, the guest virtual machine may be then be activated such that it is usable by users (via user devices 103). Activation may occur when a user provides an indication that guest virtual machine is desired to be used.

In an operation 205, the guest virtual machine may be isolated from the remainder of the cloud environment on which it operates (e.g., cloud environment 101). This may include putting network zoning in place so as to establish the guest virtual machine within a private virtual network. Accordingly, the guest virtual machine will be connected to any virtual machines also inside the private virtual network but will be isolated from other virtual machines in its cloud environment that are outside of the private virtual network.

In an operation 207, the guest virtual machine requires services, information, or other resources to operate or for its use by an authorized user. In some instances, these resources may be from a resource that is exterior to the private virtual network of the guest virtual machine. For example, the guest virtual machine may be running a process and may require services for the process from a resource exterior to the private virtual network in which it is isolated. Accordingly, in an operation 209, the guest virtual machine formulates a request for the required services (i.e., formulates a service request). The service request may include a plurality of packets, each having a source address and a destination address. The source address for packets of the service request may be the address of the isolated guest virtual machine requiring services. The destination address of the packets might be an address of a non-existent machine. In some implementations, this "non-existent address" is stored in an index (e.g., index 125 of FIG. 1) associated with or accessible to the guest virtual machine. The non-existent address causes the service request to be routed to a security appliance machine outside of the private virtual network of the guest virtual machine. The guest virtual machine only knows that a needed service exists at the non-existent address, it does not actually know where the service is located.

In an operation 211, the guest virtual machine attempts to send to the service request to the non-existent address. When this attempt is made, the service request is actually sent to a network filter (e.g., network filter 123) or other shared resource. Because the non-existent address is part of the construct enabling communication to isolated images, the service request is automatically routed to the network filter. The filter is in place to verify that the address the guest virtual machine wants to receive services from is allowed (like a personal firewall). The filter is extended to understand that the non-existent address needs special treatment. An application on the guest virtual machine asks for service, e.g., from a local agent (e.g., request over isolation module 301 from FIG. 3.). The local agent constructs the proper request for the services using the non-existent address that the filter will intercept and route to the proper location of the service provider.

Accordingly, in an operation 213 the service request is routed from the guest virtual machine to the network filter or other shared resource. In an operation 215, the network filter recognizes the non-existent address as indicating the provision of services to an isolated guest virtual machine and forwards the service request to a security appliance machine tasked with securely servicing requests for the isolated guest virtual machine (e.g., security appliance machine 107). This forwarding can be done while the isolation rules/network zoning is in place for the isolated guest virtual machine because the network filter runs on or is operated by a physical resource that supports both the isolated guest virtual machine and the security appliance machine. While the non-existent address on the packets of the service request route the packets from the isolated guest virtual machine to the network filter, the network filter knows to route packets having the non-existent destination address to the security appliance machine.

In an operation 217, the security appliance machine examines the received service request. The non-existent address of the request enables the security appliance machine to recognize that the service request is a request from an isolated guest virtual machine (specifically, the isolated guest virtual machine indicated in the source address of the request). As discussed above, the security appliance machine may include or have access to an index or other data storage (e.g., index 127 of FIG. 1) that indicates that a request having a destination address of the non-existent address is from an isolated guest virtual machine. Examination of the content of the service request enables the security appliance machine to identify resources necessary to satisfy the service request.

In an operation 219, the security appliance machine calls the identified resources and composes a reply to the service request ("service reply"). In some implementations, the reply may simply be a modification of the received service request. For example, the information necessary to satisfy the request is placed into the received request packets and their source and destination addresses may be altered. The source address of a service reply packet is the non-existent address used by the guest virtual machine in the service request and the destination address of a service reply packet is the guest virtual machine. Accordingly, in some instances, the packets that make up the initial request travel in a loop: e.g., a packet goes from the source guest virtual machine, is intercepted by the filter, is updated with the needed content, and is then sent back to the guest virtual machine to complete the needed service.

In an operation 221, the service reply may be sent from the security appliance machine to the network filter (or other shared resource). Even through the destination address of packets comprising the service reply is the guest virtual machine, the security appliance machine is aware that the guest virtual machine is isolated and therefore that isolation rules will prevent direct communication with the guest virtual machine. Accordingly, the destination address of the guest virtual machine causes the security appliance to forward the service reply packets to the network filter from which the service request packets came.

In an operation 223, the network filter sends the service reply to the requesting guest virtual machine (according to the destination address), where it may be utilized to satisfy the request. In this manner, the guest virtual machine may be provided with services from outside its private virtual network while remaining isolated.

Figure 3:
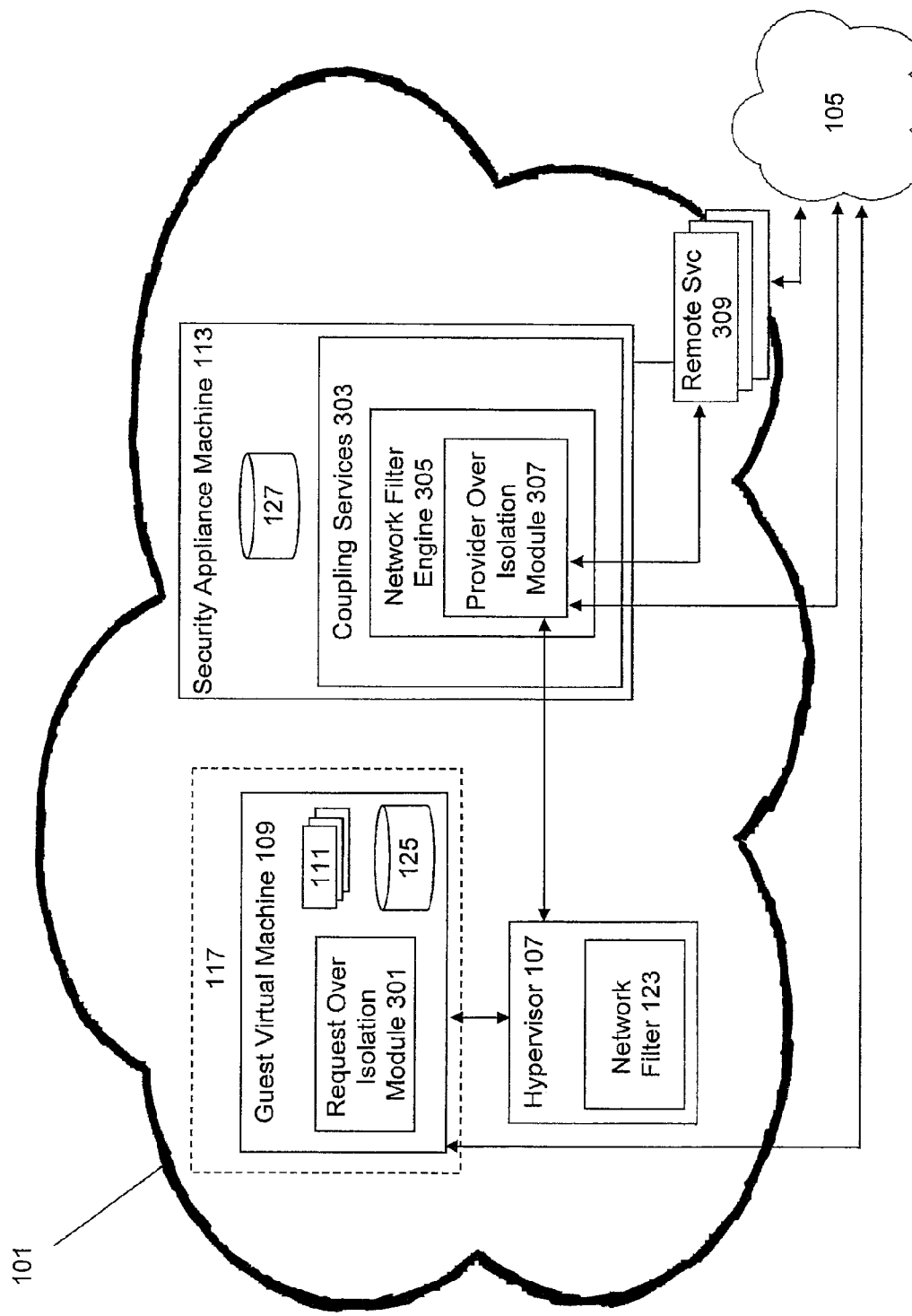
FIG. 3 is an illustration of an example system for providing isolated image communication in a cloud computing environment, according to various implementations of the invention.

FIG. 3 illustrates an example of detailed the constituent components of cloud environment 101 that may be used in the systems and methods provided herein (including security appliance machine 113 and guest virtual machine 109) to provide isolated image service communication.

In some implementations, guest virtual machine 109 may include one or more agents and/or modules that assist in management of access control procedures. For example, in some implementations, guest virtual machine 109 may include a request over isolation module 301. Request over isolation module 301 enables the provision of external services to guest virtual machine 109 (and applications/services 111 running thereon), which cannot access external services otherwise, due to network isolation (in private virtual network 117). Request over isolation module may receive an indication that guest virtual machine 109 requires services (see e.g., operation 207 of process 200) and may formulate a request (see e.g., operation 209 of process 300) to a predefined non-existing address (e.g., an IP address and/or port address) from an index 125 associated with the guest virtual machine or its private virtual network 117. This request may be sent to a network filter component or other resource shared by guest virtual machine 109 and security appliance machine 113 (e.g., network filter 123). The network filter component may be considered "local" because it operates on a physical resource (e.g., hypervisor 107) that supports guest virtual machine and security appliance machine 113.

Network filter 123 receives the request (i.e., packets) from isolated guest virtual machine 109 (see e.g., operation 213 of process 200) and routes them to security appliance machine 113 (see e.g., operation 215 of process 200), where the request is serviced as described herein. To service the request, security appliance machine 113 may communicate with resources outside of the private virtual network 117 of isolated guest virtual machine (e.g., the security appliance machine will need to connect to a remote application that can provide services/data.

Network filter 123 then receives a communication from security appliance machine 107 (see e.g., operation 221 of process 200) and may route it back to isolated guest virtual machine 109 (see e.g., operation 223 of process 200) if it is a response to the request of guest virtual machine 109.

Security appliance machine 113 may provide communication services to isolated guest virtual machine 109 using one or more modules or components and/or sub-modules or sub-components. For example, in some implementations, security appliance machine 113 may include coupling services 303. Coupling services 303 may be or include a module or application installed on security appliance machine 113 that receives service requests from guest virtual machine 109 via network filter 123 (see e.g., operation 215 of process 200). Coupling services 303 serve as a connection between the two separated (isolated) machines (the one on private network 117, guest virtual machine 109, and the one which is not on private network 117 network that provides the needed resources with no connection in between that can transmit services.

In some implementations, coupling services 303 may include a network filter engine 305. Network filter engine 305 may essentially be a remote part of network filter 123 of hypervisor 107. Network filter engine 305 finds out if received service requests are from an isolated guest virtual machine. Network filter engine may receive and examine the destination header of a service request (see e.g., operation 217 of process 200) to see if is one of the non-existent addresses indicated in index 127 and therefore that a provider over isolation module 307 should handle servicing of the request. If the destination address of a request is not the non-existent address of index 127, network filter engine 305 may pass along the service request to its proper servicing destination.

When the destination address is the non-existent address of index 127, provider over isolation module 307 receives the service request from the network filter engine 305 and inspects the data packets of the request to identify what service is requested. Information regarding what service is requested may be inside the packets (or memory if the transport done over memory rather then network). Provider over isolation module 307 may then translate the data in these request packets into a service and calls for a particular remote service 309 (which may be inside or outside of cloud environment 101) that is appropriate as identified by the inspection. The identified and called remote service 309 provides the service result, which provider over isolation module 307 uses to formulate a service reply to the service request with the service result. Provider over isolation module 307 further formulates the packets constituting the service reply with a header directing the reply to the request over isolation module 301 specific to requesting guest virtual machine 109 and not to any other machine or anywhere outside the private network 117 of guest virtual machine 109.

The systems and methods provided herein can be used to provide communication and services for isolated guest virtual machines in a robust and cost-effective manner. For example, a user leasing a guest virtual machine from a cloud provider can activate the guest virtual machine and begin using it. If the user needs the guest virtual machine to operate in his or her private environment, network isolation rules may be put in place (see e.g., operation 205 of process 200). This may include installing a request over isolation module (e.g., request over isolation module 301) on the guest virtual machine. The guest virtual machine now has no network connection to other consumer machines in the environment, and cloud provider machines, which may be desirable for security purposes.

In some implementations the isolated guest virtual machine may include access control features such as, for example, an access control agent that is installed on the isolated guest virtual machine and that communicates with the request over isolation module of the isolated guest virtual machine. The access control agent may, at time, be used to validate whether a current image status of the guest virtual machine indicates that its use is appropriate (i.e., whether the image status is "active" or "inactive"). For more information regarding image status and other access control and segregation methods, see (U.S. patent application Ser .No. 13/405, 973), entitled SYSTEM AND METHOD FOR VIRTUAL IMAGE SECURITY IN A CLOUD ENVIRONMENT, which has been filed concurrently herewith and which is hereby incorporated by reference herein in its entirety.

This validation may involve the access control agent comparing a local (i.e., to the gust virtual machine) image status to an image status stored on an associated security appliance machine that handles access control for the guest virtual machine. Accordingly, such comparison may involve the request over isolation component utilizing the communication methods described herein to communicate with such security appliance that is external to the isolated guest virtual machine's private network. In this manner, the request over isolation component sends a message (service request) to a predefined non-existent address and port number representing the security appliance that includes a request for image status (see e.g., operation 211 of process 200). The packets of the request are sent to a network filter or other shared resource on hypervisor of the guest virtual machine and the security appliance (see e.g., operation 213 of process 200). The network filter then sends the packets to a network filter engine (e.g., network filter engine 305) on the security appliance (see e.g., operation 215 of process 200), which, based on the non-existent address and port number, are handled by a provider over isolation component (e.g., provider over isolation module 307) of the security appliance. The security appliance may then calls the monitor service, gets the image status (see e.g., operation 219 of process 200), and sends a response back to the guest virtual machine via the network filter inside the network packets (see e.g., operations 221 and 223 of process 200). As described herein, using network packets is one example method of transmitting requests and replies to and from isolated images, other methods, such as, for example, using memory access, may be used. With memory access data is written to a specific place in memory inside the guest virtual machine that is accessible from a virtualization API, intercepted, sent to the security appliance machine, which runs the service in a similar way, generates the response, and this is again written directly into the memory segment inside the guest virtual machine. In this instance, there may be no need for network filter, as the direct memory API serves as a shared resource.

In another example, a user's guest virtual machine may be moved to a different host (e.g., moved to a different hypervisor, for example, either because the current one failed, because of load processing, or for other reasons). In some instances, there may be applications that know to move a guest virtual machine from one physical host machine to another based on parameters like for example load on the physical host machine (e.g., cpu, memory, etc.). When the guest virtual machine starts on the new host, its access control agent may need to verify and configure itself on the new host. Accordingly, the access control agent may connect to a portion of the new host that provides such verification and configuration services. Because the guest virtual machine is already active and isolated, it cannot open a network connection, but it can communicate using the predetermined non-existent address discussed herein. Accordingly, the request over isolation component of the isolated guest virtual machine formulates a request for the new host information (see e.g., operation 209 of process 200). This request is then forwarded to a network filter and on to a provider over isolation component (e.g., provider over isolation component 307) of an associated security appliance (see e.g., operations 211-215 of process 200). The security appliance inspects the request, obtains the information on the host that it is currently installed on, and sends this information back to the guest virtual machine via the network filter (see e.g., operations 217-223 of process 200). When the guest virtual machine gets the response back it can verify that it runs on an approved host and or perform configuration or other operations. The guest virtual machine receives this service transparently. There is no need to update the guest virtual machine to receive the service from the new appliance on the new host, it is connected to the same address as before to continue receiving the service. Only the guest virtual machine is moved, but it is expected that then the guest virtual machine is moved to a new physical host, that there is a new network filter and security appliance machine available which now provide services to the guest virtual machine under isolation. Even though the new filter and virtual appliance machine names and addresses are probably are different, because the address that the guest virtual machine is trying to connect to is not real one (i.e., the non-existent address), the services can be provided without modification to the guest virtual machine because the new network filter knows to handle service requests.

In another example, the access control component on the guest virtual machine requires the most up to date security policy from a security or access control appliance controlling the guest virtual machine. Because the guest virtual machine is activated and isolated, it cannot open a network connection to receive the policy. Rather the request over isolation component of the guest virtual machine formulates a request for the policy, sends the request to a predetermined non-existent address that causes the request to be forwarded to the security or access control appliance via a network filter or other shared resource (see e.g., operations 209-215 of process 200). The provider over isolation component (e.g., provider over isolation component 307) of the security or access control appliance inspects the data and sends the policy to deploy on the guest virtual machine via the network filter (see e.g., operations 217-223 of process 200).

Other examples of requests utilizing the systems and methods herein exist. For instance, a user of an isolated guest virtual machine may require a software update on the guest virtual machine or may make an update on the isolated guest virtual machine. Because the guest virtual machine is active and isolated it cannot open a network connection to receive the software update or provide the cloud provider with information regarding the user-initiated update. The filter mediated communication may enable such communication as described herein.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are exemplary system configurations. Other configurations may exist. Those having skill in the art will appreciate that the invention described herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more or less of the described operations may be used.

Other implementations, uses, and advantages of the disclosed technology will be apparent to those skilled in the art from consideration of the specification and practice of the invention disclosed herein. The specification should be considered exemplary only, and the scope of the technology disclosed herein is accordingly intended to be limited only by any associated claims.

What is claimed is:

1. A method to provide isolated virtual image communication in a virtual computing environment, the method executed by a processor configured to perform a plurality of operations comprising:
   isolating a guest virtual machine within a virtual network in a virtual computing environment such that the guest virtual machine is unreachable from outside the virtual network;

formulating, on the guest virtual machine, a service request addressed to a predetermined address that comprises a non-existent address for the service;

attempting to send the service request to the predetermined address, whereupon the service request is transmitted to a resource shared with a security appliance machine in the virtual computing environment, wherein the resource is not located at the predetermined address;

forwarding the service request from the resource to the security appliance machine;

formulating a reply to the service request at the security appliance machine;

transmitting the reply from the security appliance machine to the resource; and transmitting the reply from the resource to the guest virtual machine.

2. The method of claim 1, wherein the non-existent address is stored at the guest virtual machine.

3. The method of claim 1, wherein the resource shared with the security appliance machine is a network filter.

4. The method of claim 1, wherein the resource shared with the security appliance machine runs on a hypervisor that supports the guest virtual machine and the security appliance machine.

5. The method of claim 1, wherein the service request is formulated using information from the security appliance machine.

6. The method of claim 1, wherein the service request is formulated using information from a further resource within the virtual computing environment.

7. The method of claim 1, wherein the service request is formulated using information from a resource outside of the virtual computing environment.

8. The method of claim 1, wherein formulating a reply to the service request further comprises determining, at the security appliance machine, that the predetermined address indicates that the guest virtual machine is isolated within the virtual network.

9. The method of claim 1, wherein formulating a reply to the service request further comprises determining, at the security appliance machine, what resources are needed to service the request by inspecting an information content of the request.

10. The method of claim 1, wherein formulating a service request is performed because the guest virtual machine has been moved from a first host to a second host, and wherein the service request relates to verification of the second host.

11. The method of claim 1, wherein the service request relates to a software update.

12. A system to provide isolated virtual image communication in a virtual computing environment, the system comprising:

a processor configured to:
  isolate a guest virtual machine within a virtual network in a virtual computing environment such that the guest virtual machine is unreachable from outside the virtual network,
  formulate, on the guest virtual machine, a service request addressed to a predetermined address that comprises a non-existent address for the service,
  attempt to send the service request to the predetermined address, whereupon the service request is transmitted to a resource shared with a security appliance machine in the virtual computing environment, wherein the resource is not located at the predetermined address,
  forward the service request from the resource to the security appliance machine,
  formulate a reply to the service request at the security appliance machine,
  transmit the reply from the security appliance machine to the resource, and
  transmit the reply from the resource to the guest virtual machine.

13. The system of claim 12, wherein the predetermined address is a non-existent address stored at the guest virtual machine.

14. The system of claim 12, wherein the resource shared with the security appliance machine is a network filter.

15. The system of claim 12, wherein the resource shared with the security appliance machine runs on a hypervisor that supports the guest virtual machine and the security appliance machine.

16. The system of claim 12, wherein the service request is formulated using information from the security appliance machine.

17. The system of claim 12, wherein the service request is formulated using information from a further resource within the virtual computing environment.

18. The system of claim 12, wherein the service request is formulated using information from a resource outside of the virtual computing environment.

19. The system of claim 12, wherein the processor configured to formulate a reply to the service request is further configured to determine, at the security appliance machine, that the predetermined address indicates that the guest virtual machine is isolated within the virtual network.

20. The system of claim 12, wherein the processor configured to formulate a reply to the service request is further configured to determine, at the security appliance machine, what resources are needed to service the request by inspection of an information content of the request.

21. The system of claim 12, wherein formulation of a service request is performed because the guest virtual machine has been moved from a first host to a second host, and wherein the service request relates to verification of the second host.

22. The system of claim 12, wherein the service request relates to a software update.

23. A non-transitory computer-readable medium having computer-executable instructions thereon, to provide isolated virtual image communication in a virtual computing environment, the computer-executable instructions, when executed by a processor cause the processor to perform a plurality of operations comprising:

isolate a guest virtual machine within a virtual network in a virtual computing environment such that the guest virtual machine is unreachable from outside the virtual network;

formulate, on the guest virtual machine, a service request addressed to a predetermined address that comprises a non-existent address for the service;

attempt to send the service request to the predetermined address, whereupon the service request is transmitted to a resource shared with a security appliance machine in the virtual computing environment, wherein the resource is not located at the predetermined address;

forward the service request from the resource to the security appliance machine;

formulate a reply to the service request at the security appliance machine;

transmit the reply from the security appliance machine to the resource; and transmit the reply from the resource to the guest virtual machine.

24. The computer-readable medium of claim 23, wherein the non-existent address is stored at the guest virtual machine.

25. The computer-readable medium of claim 23, wherein the resource shared with the security appliance machine is a network filter.

26. The computer-readable medium of claim 23, wherein the resource shared with the security appliance machine runs on a hypervisor that supports the guest virtual machine and the security appliance machine.

27. The computer-readable medium of claim 23, wherein the service request is formulated using information from the security appliance machine.

28. The computer-readable medium of claim 23, wherein the service request is formulated using information from a further resource within the virtual computing environment.

29. The computer-readable medium of claim 23, wherein the service request is formulated using information from a resource outside of the virtual computing environment.

30. The computer-readable medium of claim 23, wherein the computer-executable instructions that cause the processor to formulate a reply to the service request further cause the processor to determine, at the security appliance machine, that the predetermined address indicates that the guest virtual machine is isolated within the virtual network.

31. The computer-readable medium of claim 23, wherein the computer-executable instructions that cause the processor to formulate a reply to the service request further cause the processor to determine, at the security appliance machine, what resources are needed to service the request by inspection of an information content of the request.

32. The computer-readable medium of claim 23, wherein formulation of a service request is performed because the guest virtual machine has been moved from a first host to a second host, and wherein the service request relates to verification of the second host.

33. The computer-readable medium of claim 23, wherein the service request relates to a software update.

\* \* \* \* \*